April 23, 1940.   W. T. SMITH   2,197,901
ENGINE
Filed March 29, 1938   5 Sheets-Sheet 4
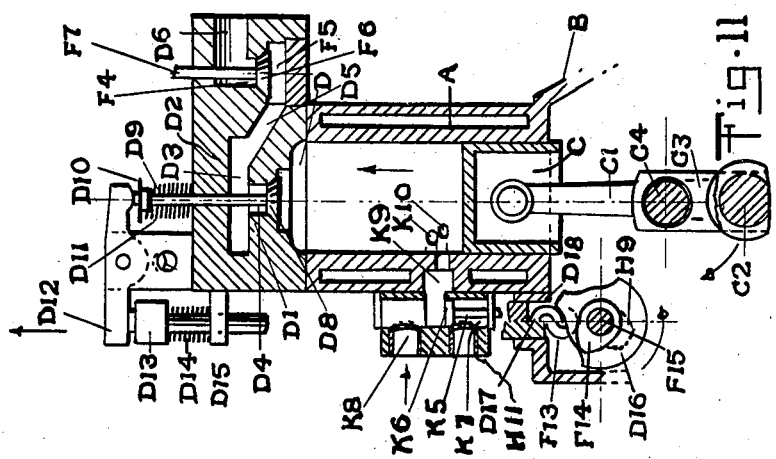
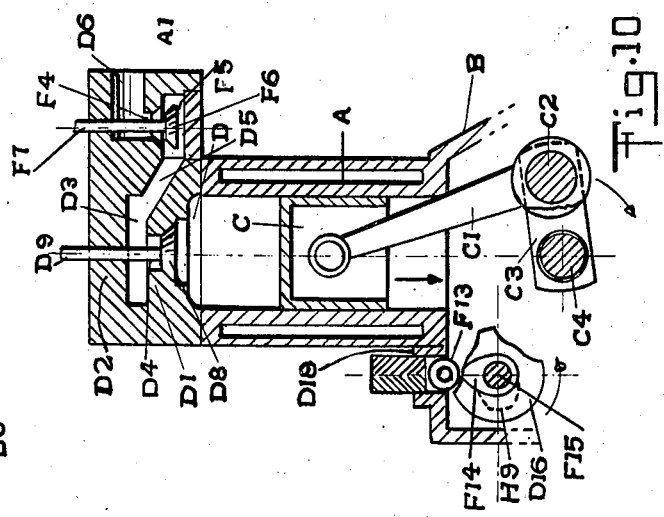
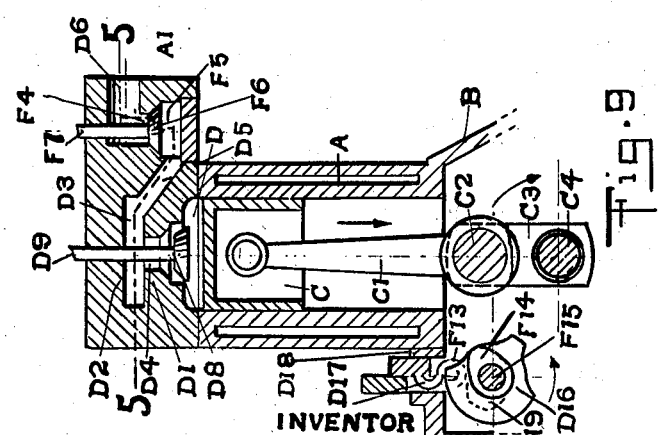
WITNESSES
Morgan S. Mathews
R. J. Vanderhorst
INVENTOR
William T. Smith

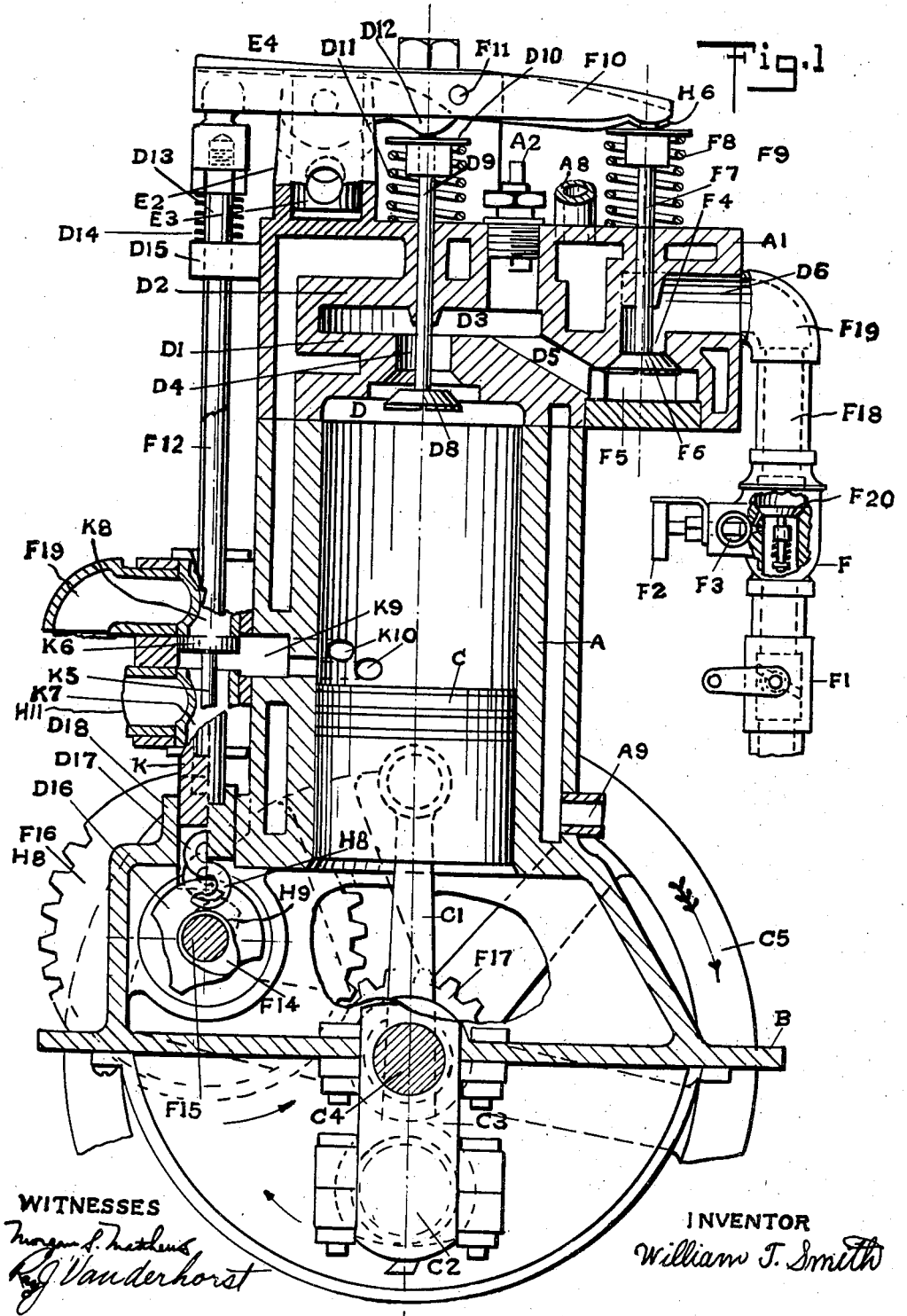

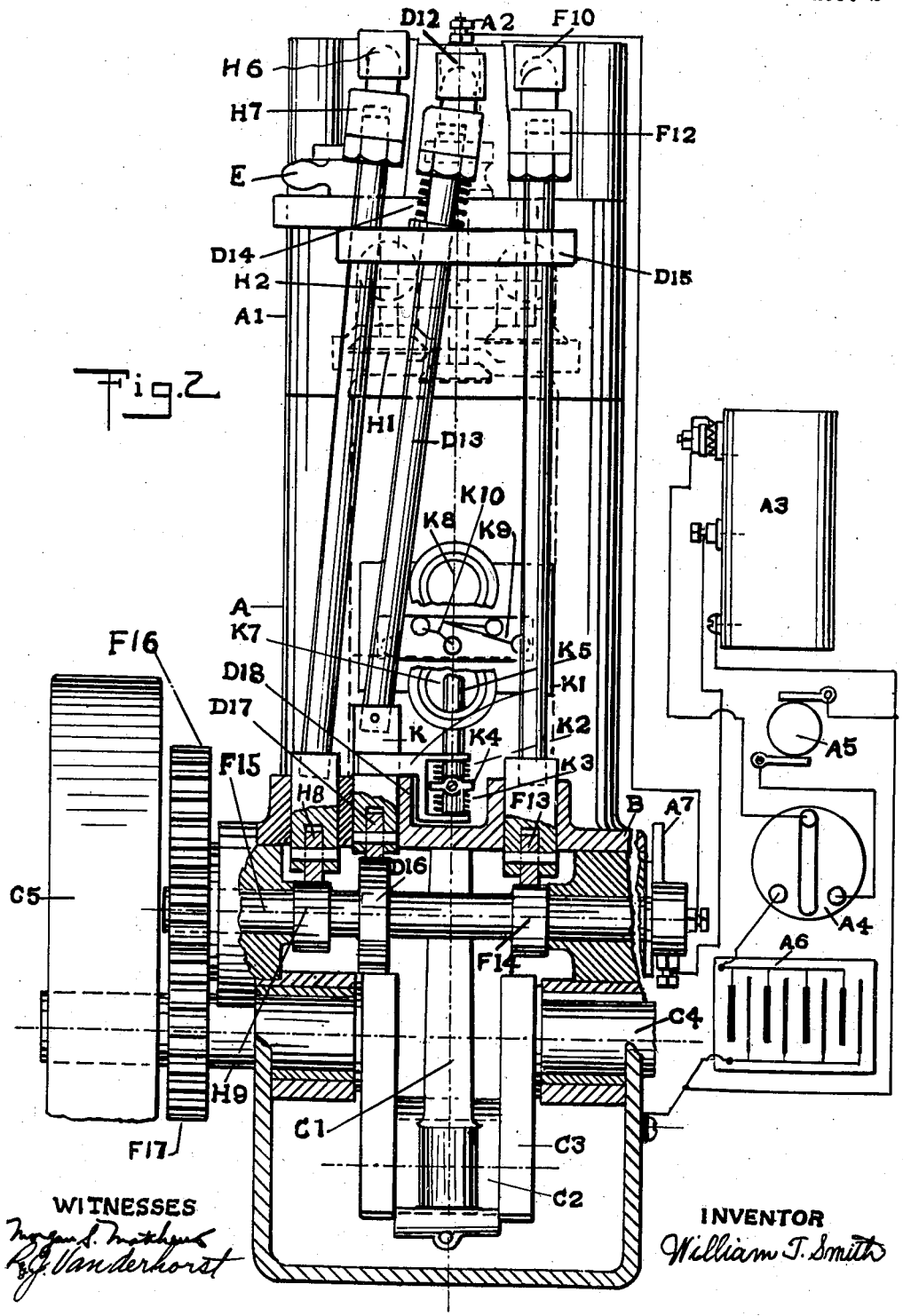

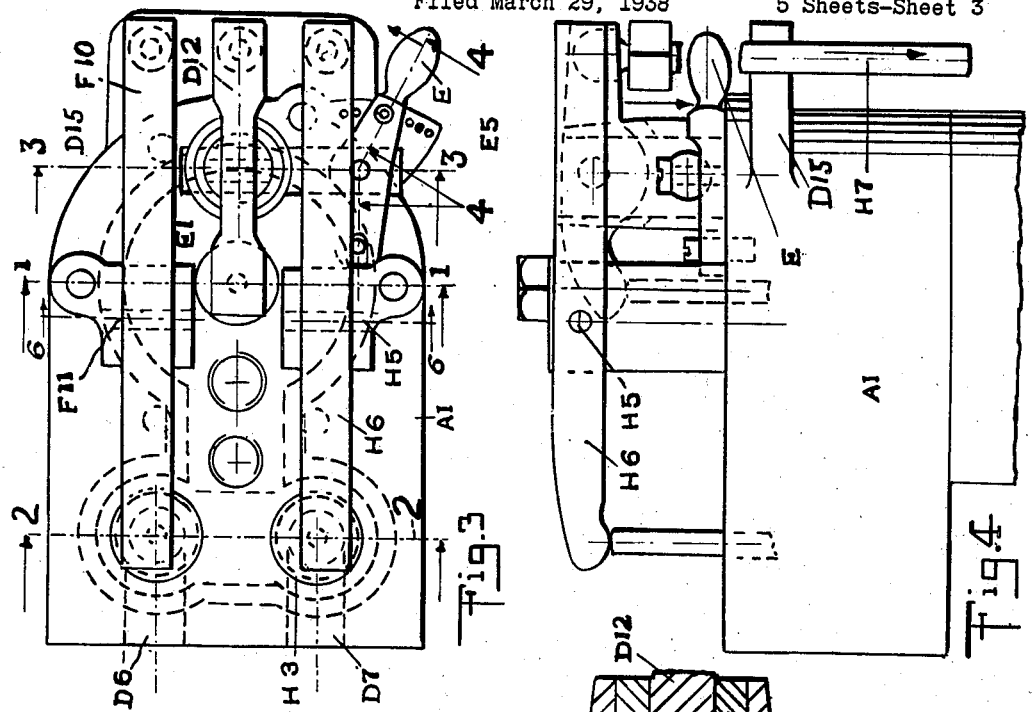
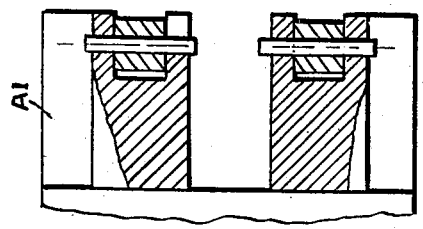
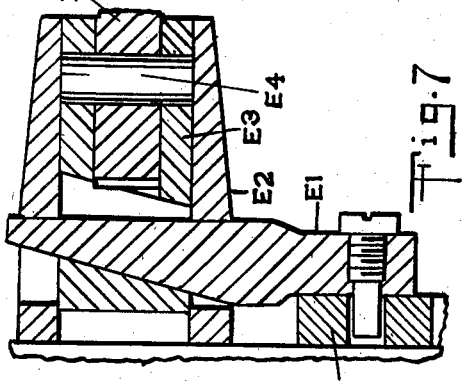
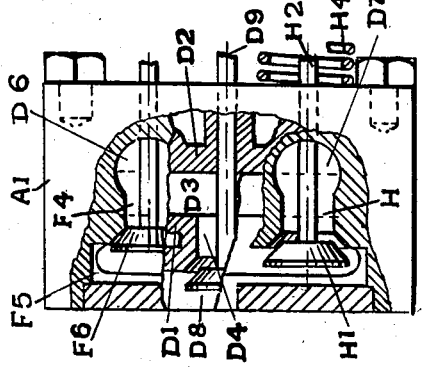
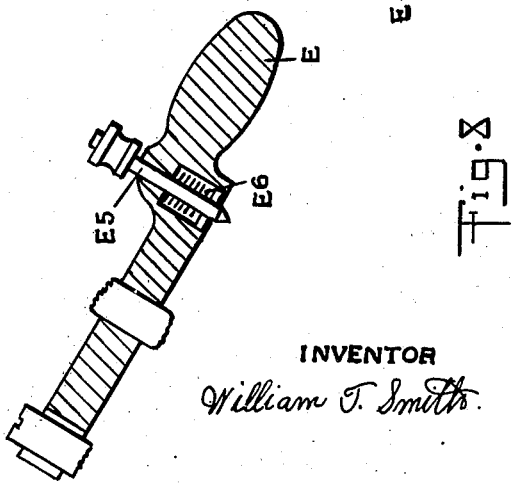

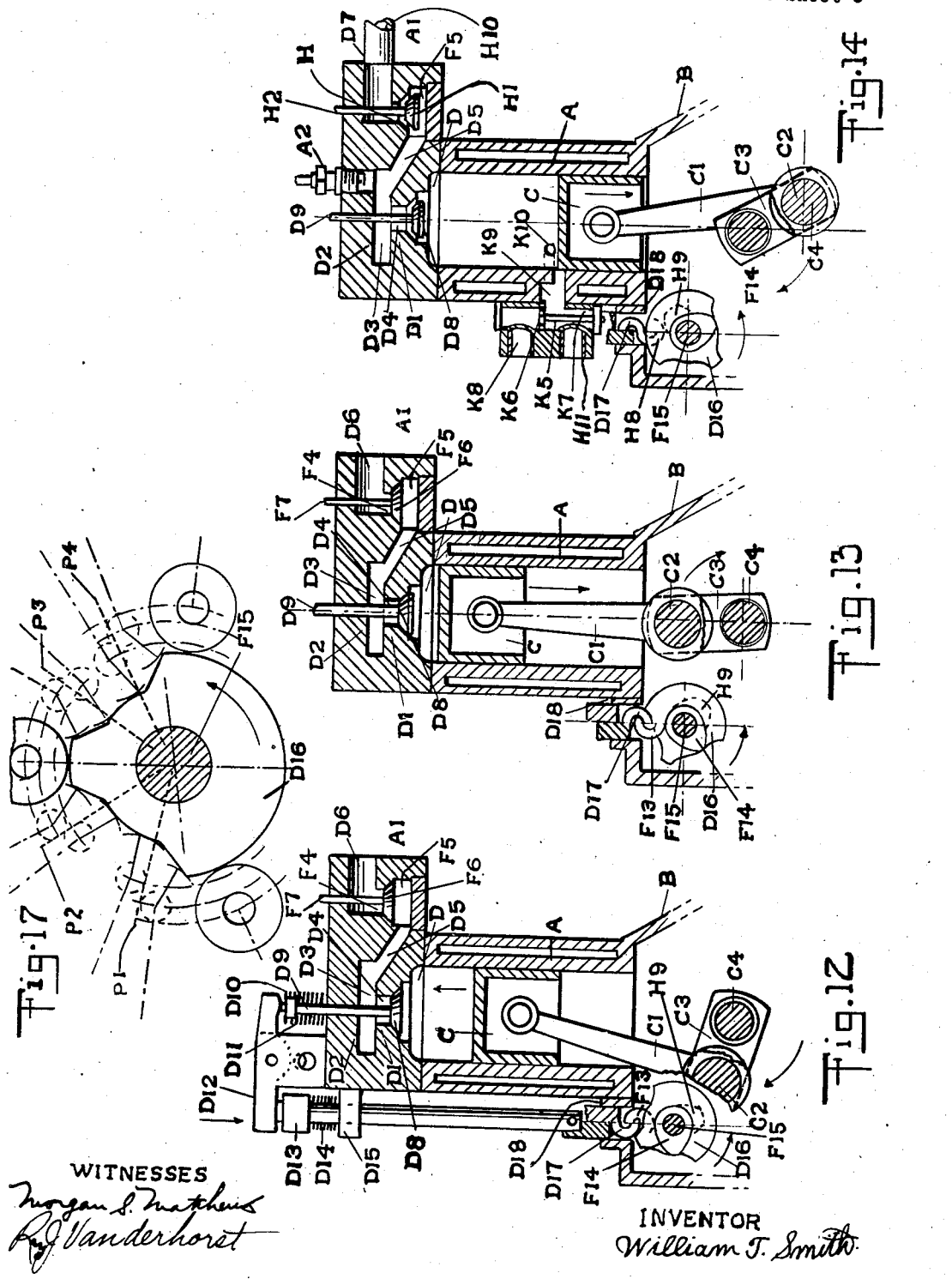

Patented Apr. 23, 1940

2,197,901

UNITED STATES PATENT OFFICE 2,197,901

ENGINE

William T. Smith, Arlington Heights, Ohio

Application March 29, 1938, Serial No. 198,738

44 Claims. (Cl. 123—65)

The object of the invention is to provide a more powerful and efficient engine that may be provided with unitary cooperating mechanism.

Another object of the invention is to provide a new and improved engine using two or more mixing or combustion chambers wherein combustible, partially combustible or non-combustible fluid, in various combinations, may be admitted and compressed to two or more different pressures in respective of the chambers, during two or more single or mutiplicate stage mixing and compression operation, and these chambers may be supported in juxtaposition on or located near the cylinder or cylinders of the engine or connected there-with and provided with channels opening there-into, and these chambers are to be provided with valve controlled inter-communicating channels and valve controlled channels leading to a source of fluid supply and the atmosphere respectively.

Another object of the invention is to provide an engine having manually actuated cooperating controlling means where-by greater or lesser quantities of fuel or fluid can be admitted into the cylinder or cylinders independent of any other controlling means.

Another object of the invention is to provide a new and improved engine of the character described, that most builders of many types of engines could use at no great expense in the changing of their equipment, in which fluid is ignited in a container or containers, that are provided with partitions or inclosures, having openings leading to and from and provided with valve closures therein, that may be actuated at times to prevent the inter-mingling of fluid of a greater pressure with fluid of a lesser pressure in certain container or containers, and the container or containers communicate with a cylinder or cylinders at times, in which a piston or pistons are mounted to reciprocate, to cause fluid to enter the cylinder or cylinders, be compressed to the same or different pressures in respective containers, before being mixed in the cylinder or cylinders, and subsequently evacuated there-from successively, with-out having been or having been ignited in the container or containers or the cylinder or cylinders.

For the purpose mentioned use is made of one or more cylinders, in which reciprocates a piston or pistons, means for conducting combustible or other fluid into the upper or outer end of a chamber or chambers adapted to communicate with the cylinder or cylinders at times, means for conducting partial or non-combustible or other fluid, preferably, into the end or ends of the cylinder or cylinders, directly opposite to the above mentioned chamber or chambers or clearance space or spaces communicating with the chamber or chambers, the first named means carries a means for actuating closures in passageways and openings leading to and from the chamber or chambers and clearance spaces successively, the second named means carries a means for actuating closures in the passage-ways and openings leading to and from the cylinder or cylinders successively, means for igniting the fluid in the chamber or chambers after being compressed therein, means for passing the products of combustion into the cylinder or cylinders, where-in the combination of the mixtures can be completely burned before being expanded therein successively, and means for evacuating all of the products of combustion to atmosphere, successively during each complete cycle of the engine or engines.

It is understood that certain kinds of fuel when conducted into the cylinder or cylinders and converted and heated by the residue heat retained there-in, will, when compressed to a relatively high pressure before being ignited produce more intensive heat.

With the above and other objects in view my invention consists of a complete general purpose engine, designed to use one or more cylinders, and the combination, arrangement, and details of construction disclosed in the drawings and specification, and then specifically pointed out in the appended claims.

A practical embodiment of the invention is represented in the accompanying drawings forming a part of this specification, in which similar characters of reference indicate corresponding parts in all the views.

Figure 1 is a side elevation of a drawing illustrating one method of building the engine, parts being in section and parts being broken out and the gear cover and secondary spark plug not shown; Fig. 2 is a rear elevation of the same, parts being in section, and one method of ignition connected to one spark plug shown diagrammatically; Fig. 3 is a plan, and Fig. 4 a side view of the head end of the engine; Fig. 5 is a side view of Fig. 3 partly in section taken on lines 6—6 looking in the direction indicated; Fig. 6 is also a side view of Fig. 3 the parts taken on indicated lines being shown in section, taken partly on lines 1—1 and 2—2; Fig. 7 is an enlarged section taken on lines 3—3 of Fig. 3; Fig. 8 is also an enlarged section taken on lines 4—4 of Fig. 3 looking in the direction indicated; Figures 9 to 14 inclusive are small sectional views of parts that are common to all units of an engine that may or may not be provided with a plurality of cylinders and showing an arrangement of cylinder, cylinder head, piston, crank shaft, and valve actuating means in six approximate critical positions; Fig. 15 is a small sectional view taken on lines 5—5 of Fig. 9 showing the chamber, passage ways and port openings leading to and from the clearance space in the cylinder head; Fig. 16 is a view of Fig. 9 and the resultant effect of the movement of the parts shown in section on Figures 12, 13 and 14 will be more readily understood by referring to Figures 3 to 8; Fig. 17 is an enlarged view of the cam D16 in which the dotted lines P1, P2, P3, and P4, indicate the normal position of the cam mentioned as shown in Figures 10, 11, 12 and 13 respectively, and when the lever E is moved in the direction indicated, the valve D8, actuated by the connections shown will move by degrees to a state of rest, while the volume of the fluid passing into the cylinder will gradually decrease to nothing, but when the lever mentioned is moved in an opposite direction the volume of the fluid will gradually increase to a maximum quantity.

The drawings designed to illustrate the engine, while they show only one of each of the component parts of the engine or device, it is obvious that other assembled units of the essential parts thereof, may be connected to other parts that are common to all engines of like nature or kind, and those assembled units may be disposed in various groups or in different group arrangement and the parts disclosed will be designated by the use of reference letters and figures.

The engine as illustrated is provided with a cylinder A the upper outer end of which is closed by a head A1, and the lower or outer end of the cylinder A, is connected to or mounted on the engine bed or casing B. The cylinder A and head A1 are shown in Fig. 1 and Fig. 2 as being disposed vertically, but they may be arranged otherwise to suit certain particular requirements.

In the cylinder A is mounted to reciprocate a piston C, connected by a connecting rod C1, to a crank C2 of the crank arm C3 connected to the crank shaft C4, journaled in suitable bearings arranged on the engine bed or casing B. The shaft C4 is provided with a flywheel or pulley C5, located on one end thereof for transmitting the rotary motion to power driven instrumentalities, and the other end thereof may be used either to transmit power to or receive it from another engine or other source of supply.

The cylinder head A1 is designed to close the upper or outer end of the cylinder A1, and provide a clearance space D, the area of which is reduced to its minimum capacity when the piston is in the upper or outer-most position, and the cylinder head A1 is also provided with partitions, the inner or lower end of which D1, has side walls extending upward or outward and connecting with another partition D2, thereby forming an inclosure or chamber D3, located in juxtaposition with the outer walls of the cylinder A or cylinder head A1; the partition D1 is provided with an opening or valve port D4, communicating with the chamber D3 and the clearance space D, and the chamber D3 has an opening or openings communicating with a channel-way D5, leading to a passage-way F5, communicating with a port opening F4, connected to a passage D6, through which fluid may be allowed to flow from one source of supply F, through pipe F18 and elbow F19 into the passage D6.

Mounted to be actuated within the valve port D4, is a four time actuated per cycle closure or valve D8, provided with a valve stem D9, connected to a washer D10, adapted to be moved into an outer or upper most position by a spring D11, while fluid is being admitted into the cylinder A at times and while same fluid is compressed and ignited in the chamber D3 successively, and the valve D8 is moved in an opposite direction by one end of a rocker arm D12, pressing against the valve stem D9 connected to the valve D8 thus allowing fluid to enter chamber D3 before being compressed therein successively; the pin E4 supports the rocker arm D12 the other end of which is in contact with the upper or outer end of the push rod D13, normally supported by the spring D14 resting on the lug D15, and the rod D13 is caused to move when parts of the periphery of cam D16 are in engagement with the roller D17 secured to the lower or inner end of the guide K, which is mounted to slide in the guide way D18 on the engine bed B, the upper or outer end of the guide K is secured to the valve rod D13, and the cam D16 is secured to the cam shaft F15.

The guide K mentioned above is also provided with the connection K1, which carries two arms one of which is in contact with spring K2 while the other is in contact with the spring K3; and located between the springs K2 and K3 is the spring washer K4 secured to the valve stem K5 attached to the valve head K6, actuated to form closures between another fluid supply opening K8 and another exhaust pipe opening K7 both of which communicate with the chamber K9 on alternate reciprocations of the piston C, and the chamber K9 is provided with one or many passage-ways K10 opening into the interior of the cylinder A; the springs K2 and K3 mentioned are provided due to the variable distance traveled by the push rod D13 at times, and the passage-ways K10 may be located considerably nearer to the head end of the engine.

The movement of the valve D8, is manually controlled at times, to allow a greater or lesser volume of combustible or other fluid to enter the cylinder A, and for this purpose the lever E is connected to a wedge E1 in sliding contact within the extension E2 formed or attached to the cylinder head A1, and the wedge E1 causes the sliding member E3, to move in either direction and with it the rocker arm D12 fulcrumed on the pin E4. Normally the lever E is held in a central position by the pin E5 pressed on by the spring E6, and in other positions by the action of the same spring mentioned. When the lever E is moved in the direction indicated it will cause one end of the rocker arm to move upward or outward, and the spring D14 will hold the push rod D13 connected to the roller D17 out of engagement with a part of the periphery of the cam D16 for this and other reasons hereinafter described.

The outer end of the opening D6 is connected to an elbow F19 opening into the pipe F18 communicating with one of the carburetors or fuel mixing devices F, each of which is provided with a throttle valve F1, needle valve F2, fuel supply pipe F3 and poppet check valve F20 all of which are used in combination to regulate the quantity of any suitable particular kind of fuel or fluid required or used; and the other end of the opening D6 connects with the port opening F4, leading to a passage-way F5, opening into the channel-way D5, communicating with the combustion chamber D3, opening into the valve port D4, in communication with the clearance space D of the cylinder A.

The port opening F4 is provided with a check valve F6 connected to the valve stem F7, which is connected to the washer F8 and normally held in an outermost position by the spring F9, and the valve F6 may be mechanically actuated by providing a lever F10, fulcrumed on a pin F11, and one end of the lever F10 will be engaged by the valve stem F7 while the other end thereof is in engagement with the adjustable end of the push rod F12, the opposite end of which is provided with the roller F13 located in a position to be engaged by the cam F14, located on the cam shaft F15 journalled in suitable bearings provided on the engine bed or casing B, which by the connections shown will cause the valve F6 to form a closure in the port opening F4 when the cam shaft F15 is caused to rotate; and the cam shaft mentioned is caused to rotate by the gear F16 connected thereto, engaging the gear F17 secured to the crank shaft C4.

The products of combustion pass out of the cylinder A, through the valve port D4, combustion chamber D3, channel-way D5 and passage way F5 previously mentioned, but in this case through valve port H, one end of which communicates with the passageway F5, and the other end thereof is connected to the exhaust opening D7; and this exhaust opening D7 is provided with a pipe or other connection or connections leading to atmosphere or to one or more engine devices.

The mechanism for actuating the valve H1, located in the port opening H, is similar to the described mechanism used to cause valve F6 to form a closure in the port opening F4 at times and the valve H1 is provided with the valve stem H2 connected to the washer H3, pressed on by the spring H4, which holds the valve closed; the pin H5, holds the lever H6, in position to allow one end thereof to contact valve stem H2, while the other end of this lever is in contact with the push rod H7, the inner or lower end of which is provided with the roller H8, contacting the cam H9 at times, and the cam H9 is attached to the cam shaft F15, which is caused to rotate by the gears F17 and F18 previously mentioned and by the connections shown the valve H1 will be caused to actuate in timed relation with other cooperating parts successively.

When the engine is running and certain of the component parts thereof are in the approximated positions shown in Fig. 9 valve D8 will be open while check valve F6 is opening and the piston, crank, and cams are moving in the direction indicated and fluid will be caused to flow from one source of supply or carburetor F, through connections leading to passage D6, indirectly communicating with the cylinder A; while the several parts are advancing to that position where the valve D8 closes. Fig. 10 indicates a position called the second part of the admission stroke of this cycle, and before the several parts have advanced to the position designated as Fig. 11, the valve F6 will have closed, before partial or non-combustible or other fluid may be allowed to flow through the second carburetor F and connections leading to pipe F19, and past valve K6 into port opening K8, and then into chamber K9 and passage-ways leading thereinto the cylinder A. Fig. 11 is an approximately critical or preparatory position of many of the component parts, being or about to be actuated at this time; the valve F6 will have closed, and valve K6 will start to move upward or outward to close communication between the second carburetor mentioned above and the chamber K9, and at this same time the movement of the cam D16 will by the connections described also move one end of the rocker arm D13 in the same direction and at the same timed upward or outward movement of the valve K6, and the other end of the lever D13 will as indicated cause valve D8 to move downward or inward and open communication between the cylinder A and the combustion chamber D3, to allow fluid to enter and be compressed in this chamber during the first period of the compression stroke, and while the piston C is moving to that position shown in Fig. 12 the starting position of the beginning of the second part of the compression stroke, at which time D8 will close at the end of the first period or low pressure part of the stroke. Figure 12 also illustrates the position of the several parts with all valves closed in the openings opening or leading there-into the cylinder A. Fig. 13 shows the approximate ending of the second period or high pressure part of this stroke, at which time the cam D16 and the valve D8 will be in a position to be actuated by the connections described, and the valve D8 will start to open communication between the combustion chamber D3 and the cylinder A in timed relation to the movement of the timer-distributor unit, driven by or connected to the cam shaft F15 shown diagrammatically in Fig. 2, and by the electrical connections described cause a high voltage electric current to jump the gap provided in the spark plug or plugs A2 and thus ignite the fluids separatively or otherwise before being expanded in the cylinder or cylinders A. Fig. 14 shows the position of the several parts mentioned at about the time that the products of combustion are starting to exhaust out of the lower or inner end of cylinder or cylinders A through passage-ways K10, port opening K7, and pipe connecting with or leading to atmosphere, and as piston C moves upward or outward and forms a closure over the passage-ways K10, the second part of the exhaust stroke will be started, and the remainder of the products of combustion will pass out through valve port D4, combustion chamber D3, channel-way D5, passage-way F5, valve port H and passage D7, also connected with or leading to atmosphere. When the piston C has reached the position shown in Fig. 9 the part of a cycle will end and then a new cycle start.

The interior walls of the cylinder or cylinders, chambers, and channels subjected to the heat of combustion are provided with exterior walls adapted to provide inclosures through which a continuous circulation of a cooling may be maintained at all times and these walls must be of uniform thickness through-out the cylinder structure to prevent the metal from rupture due to the unequal expansion thereof in high pressure engines operating at a high temperature during continuous operation during a long period of time, and the openings A8 and A9 are provided for the entry and exit of this cooling fluid.

The engine when used to supply the motive power for a motor driven vehicle, or other kind of conveyance, would by using the described combination and arrangement of the essential component parts disclosed in this method of producing more power or energy, and at the same time use less fuel while doing so.

The principal feature of the improvement used to provide various fuel combinations, can by the described movement of the lever E prevent fuel from entering the cylinder A either directly or indirectly where it is not ignited either directly or indirectly, whether the valves and chambers are located in the head of the cylinder or attached to the cylinder in an inverted position to the one shown, or part of them other-wise, and in either case air would enter through the port K7 and chamber K9 connected by passage-way K10 opening into the cylinder A; the air or fluid would be compressed in and exhausted out of the cylinder or cylinders and retard the movement of the piston or pistons C and all power transmitting units in the combination.

It is obvious that after carefully studying the component parts of the engine and their arrangement, that it can be used to mix and combine two or more kinds of fluid to device various compounds, and that it can be driven by any available power with out using an ignition apparatus.

I do not desire to limit myself to the precise details of construction and arrangement as above described, particularly the placing of the valves and chambers in the head of the engine and indirectly actuating the valves or forming the chambers as a part of the cylinders and directly actuating the valves, as it is obvious that various modifications may be made there-in with out departing from the essential features of my invention as defined in the appended claims.

What I claim as my invention is:

1. An engine comprising a cylinder, a cylinder head closure, a low pressure compression chamber, an ignition device in said chamber, a piston closure in said cylinder forming a high pressure mixing space, inter-communicating channels opening into said cylinder and said compression chamber and mixing space, reciprocally actuated multiplicate and single valves controlling the passage of fluid into and out of said cylinder successively, certain of said channels terminating in a source of fuel supply, certain of said channels terminating in atmosphere, a channel-way connecting said compression and mixing space, a valve in said channel-way adapted to be manually controlled for preventing the passage of fluid through said channel-way at times, a shaft operatively connected to said piston closure, a valve actuating mechanism operatively connected to said shaft and all mechanically operated valves, and an ignition system adapted to cause said ignition device to function in timed relation to the movement of the said piston closure.

2. An engine comprising a cylinder, a cylinder head closure, a low pressure compression chamber, an ignition device in said chamber, inter-communicating channels connecting said cylinder with a source of fuel supply at times, inter-communicating channel-ways connecting said cylinder with the atmosphere at times, reciprocally actuated multiplicate and single valves controlling the passage of fluid into and out of said cylinder successively, a piston closure in the said cylinder forming a high pressure mixing chamber at times, valve controlled inter-communicating passages connecting said cylinder and said space with another source of fuel supply at times, valve controlled inter-communicating passage-ways adapted to connect the atmosphere with said passages opening into the said cylinder, a valve controlled channel terminating in said compression chamber and said mixing space and adapted to pass fluid at times, a primary fluid supply controlling mechanism provided with manually controlled instrumentalities adapted to determine the volume of fluid admitted into the said compression chamber independent of other fluid supply controlling apparatus, a shaft operatively connected to the said piston closure, a valve actuating mechanism operatively connected to said shaft and all mechanically operated valves and adapted to function in timed relation to the movement of said piston closure while a compound fluid mixture is admitted and subjected to different pressures before ignition in and allowed to pass in different directions out of said compression chamber and said space and cylinder successively, and an ignition system adapted to cause said ignition device to function in timed relation to the movement of the said piston.

3. An engine comprising a cylinder, a cylinder extension closure, a piston mounted to reciprocate in the said cylinder and forming an inclosure in the said cylinder and extension closure relative to the volume of the piston displacement, partitions disposed in the said inclosure forming chambers adapted to contain comparative greater volumes of fluid at a lesser pressure and lesser volumes of fluid at a greater pressure, valve ports connecting the said chambers, valve ports connecting different sources of fluid supply with channels leading to respective chambers, valve ports connecting different exhaust conveying connections with channels leading to respective chambers communicating with the said cylinder, valves actuated in all of the said valve ports, manually actuated instrumentalities for changing and adjusting the movement of a contact arm actuating the said valve in the said valve port connecting the said greater and lesser pressure chambers, a valve actuating mechanism controlling the movement of all of the said valves in the said ports, an ignition device in certain of the said chambers containing combustible fluid, and instrumentalities for causing the said valve mechanism to move in timed relation with the movement of the said piston.

4. An engine comprising a cylinder, a coexistent closure on one end of the said cylinder, a reciprocating piston, a multiplicate compression chamber, a single stage compression chamber, a primary admission port connected to a source of fuel supply, a primary exhaust port leading to the atmosphere, a port opening connecting the said multiplicate and single stage compression chambers, a conjunctive channel connecting the said admission and exhaust ports with the said single stage compression chamber, valves actuated in all of the said ports, manually controlled instrumentalities adapted to increase or decrease the travel of a certain valve independent of similar or other instrumentalities for adjusting the travel of the other valves, a secondary admission valve port connected with a source of fluid supply, a secondary exhaust port leading to the atmosphere, a chamber connecting with channels opening into the said cylinder and connecting with the said secondary and admission ports, a valve actuated to close the said secondary admission and exhaust ports alternately, a cam shaft, a crank shaft operatively connected to the said piston and the said cam shaft, accessories actuated by the said cam shaft and operatively connected to all of the said valves, an ignition device in the said single stage compression chamber electrically connected thereto and with an ignition system operatively connected to or driven by the said cam shaft.

5. An engine comprising a cylinder, a coexistent closure on one end of the said cylinder, a fuel mixing combustion chamber communicating with the said cylinder, a channel and channel-ways connecting the said combustion chamber with alternately controlled sources of fuel supply and the atmosphere, valves actuated in the said combustion chamber and the said channel-ways successively, a piston reciprocating in the cylinder inclosing a high pressure compression space with a port opening into said combustion chamber at times, coexisting auxiliary channel-ways opening into the said cylinder and providing a two way valve controlled fluid supply for the said combustion chamber, a channel connected with a source of fluid supply and a channel leading to atmosphere and alternately connected with the said two way valve controlled combustion chamber, valve actuating mechanism operatively connected to the valves forming closures in the said combustion chamber and channel-ways leading to the source of fluid supply and the atmosphere and port opening into the said compression space at times, a two way valve controlled chamber with passage-ways leading into the cylinder and channel-ways connected with respective sources of fuel or fluid supply and the atmosphere successively, a cam shaft operatively connected to the said piston, a crank shaft operatively connected to and rotated in timed relation with the reciprocations of the said piston, an ignition device in the said fuel mixing combustion chamber, and a timer-distributor driven by the said cam shaft and electrically connected to the said igniting device.

6. An engine comprising a cylinder, an extension cylinder head, dual inter-communicating inclosures formed in the cylinder structure, the said inclosures connected by a valve controlled port opening, dual valve controlled port openings and channels connecting relative sources of fluid supply with respective of the said inter-communicating inclosures, dual valve controlled port openings connecting relative exhaust conveying channels with respective of the said inter-communicating inclosures, dual cams controlling certain admission and exhaust valves respectively, dual peripheric cam projections controlling a certain valve during partial admission and partial compression periods of certain succeeding strokes of a cycle, dual way actuating valve actuated mechanism, single valve control regulating instrumentalities manually actuated, a piston reciprocating in the said cylinder, a crank shaft, a cam shaft operatively connected to the said piston and the said crank shaft, said cams and said cam projections are connected to the said cam shaft and operate mechanism provided for operating all of the said valves successively, dual ignition devices in the said dual inclosures, a dual electric system operatively driven from the said cam shaft, and electrical connections connecting the said system with the said ignition devices.

7. An engine comprising a cylinder, a cylinder head, single and multiplicate stage compression chambers with valve controlled separating closure, a piston reciprocating in the said cylinder forming an inclosure, conjunctive channel-ways and valve controlled ports opening into the said inclosure from one direction, conjunctive channel-ways and valve controlled ports opening into said inclosure from another direction, movable valve closures in all the said port openings and the said separating closure, a cam shaft with cams thereon and operatively connected to respective of all valve closures, a valve mechanism actuating all of the said valve closures successively, an ignition device in the said single stage compression chamber, a crank shaft rotatively connected to the said piston, and means for causing the ignition device to ignite a fluid combustible mixture.

8. In an engine, a cylinder, a cylinder head, a piston closure moving therein, high and low pressure separated inclosed closures provided with inter-communicating valve controlled opening and inlet and outlet valve controlled openings leading into and out of the said cylinder at times successively, valves actuated in all of said openings certain of which is adapted to separate multiplicate volumes of fluid of different constituents compressed to comparatively high and low pressures in respective of the said closures at times, instrumentalities operatively connected to the said piston and adapted to actuate all of the valves, and accessories adapted to be manually controlled for determining respective different volumes of fluid utilized in the said cylinder.

9. In an engine valve actuating apparatus, a piston operatively connected to a crank shaft, a cam shaft provided with cams and driven by the said crank shaft, a valve actuating mechanism operating valve closures and driven by respective of the said cams, multiplicate way actuated instrumentalities arranged and adapted to cause certain parts of the said valve actuating mechanism to come to a standstill or be moved more or less and thus regulating the volume of fuel admitted there-into the cylinder, and a movable connection whereby the said instrumentalities are manually controlled that may be used independent of other speed control or fluid mixing apparatus.

10. In an engine cylinder and fuel controlling valve apparatus, inclosed multiplicate low and high pressure chambers opening into each other, admission and exhaust closures connected to sources of fuel supply and the atmosphere respectively, conjunctive channels connecting the said admission and exhaust closures with respective of the said low and high pressure chambers, an actuative valve closure in the said opening connecting the said low and high pressure chambers, valve mechanism adapted to actuate the said closure and closures, manually controlled instrumentalities adapted to change or control the movement of the said mechanically actuated closure in the said chambers at times, cylinders disposed in chosen arrangement, pistons reciprocating in the said cylinders causing fluid to enter, be compressed and be exhausted therefrom successively, a crank shaft arrangement, a cam and cam shaft arrangement, and the said pistons are operatively connected to the said crank shaft and cam and cam shaft arrangements.

11. In combination a shaft, a cylinder, a cylinder head, a piston in the said cylinder arranged to be impelled by fluid, a chamber, an ignition device in the said chamber, a space formed in the said cylinder interposed between the said piston and the said cylinder head, valve controlled channels leading into the said chamber, valve controlled channels opening into the said space, a valve controlled channel opening into the said chamber and space provided in the said cylinder, said ignition device ignites fuel in the said chamber which ignites fuel in the said space and the products of combustion contact the said piston, connecting means for causing the said shaft to rotate as the piston reciprocates, a valve mechanism operatively connected to the said shaft and actuating all of the said valves, a cam shaft provided with cams and driven by the said shaft, manually controlled apparatus adapted to move and hold particular members of the said valve mechanism in an adjusted position for controlling a channel connecting the said chamber and the said space, and connecting means for causing the said ignition device to function in timed relation with the movement of the said piston.

12. An engine comprising a cylinder, a cylinder head, a piston reciprocating in the said cylinder, primary and secondary controlled mixing chambers opening into each other and opening into the cylinder at times, primary and secondary controlled admission and exhaust channels communicating with the said mixing chambers, and the said admission and exhaust channels communicate with respective sources of fluid supply and the atmosphere at times, a cam shaft provided with cam actuated instrumentalities operatively disposed and designed to actuate respective valves forming closures between the said mixing chambers and the said admission and exhaust channels leading into the said cylinder successively in timed relation with the movement of the said piston, an ignition device for causing fluid to be ignited in the said mixing chambers successively, a crank shaft connected to and caused to rotate as the said piston reciprocates, a timer-distributor unit driven from the said cam shaft and electrically connected to the said ignition device, and the cam shaft and the said crank shaft are relatively and operatively connected.

13. A distributing device comprising a cylinder, a cylinder head closure, a piston closure moving therein, multiplicate purpose chambers opening into the cylinder, channels leading into and out of said chambers and said cylinder and providing a single inclosure at times, a distributing valve adapted to separate different fluid volumes at different pressure at times, valves in certain of the said channels leading to sources of fuel supply and the atmosphere respectively, a crank shaft, a cam shaft, instrumentalities operatively connected to the said piston and said crank and cam shafts and adapted to operate all of the said valves successively, and instrumentalities manually controlled at times and adapted to adjust the travel of the said distributing valve relatively to the movement of the said piston and thus determining the volume of different fluids in respective of the said chambers.

14. A fluid compound mixing and distributing device comprising a cylinder, a cylinder head closure, a piston closure forming an inclosure, valve controlled channels connecting various sources of different fluids containing different essential constituents with the said inclosure, valve controlled channels connecting said inclosure with atmosphere, a multiplicate stage univalve controlled compression chamber adjoining the said cylinder and provided with a channel opening thereinto, a distributing valve reciprocally actuated in the said channel opening into the said cylinder during succeeding strokes of the said piston closure at times, a shaft, a cam shaft, instrumentalities operatively connecting the said shaft and cam shaft with the said piston closure and all of the said valves, and an actuating mechanism driven by the said shaft and cam shaft and operating all of the said valves successively.

15. A device of the kind described comprising a cylinder, a cooperative cylinder annex, a piston actuated in the said cylinder, an admission chamber with intermediate channels connecting with a fluid supply and the atmosphere respectfully and associatively connected with the said cylinder, valve closures in the said channels, an intermediate admission chamber formed between the said piston and the annex and provided with valve controlled channel leading into the said cylinder, a valve in the said valve controlled channel, valve controlled passage-ways opening into the said cylinder and connected to respective conduits leading to another source of fluid supply and the atmosphere, a shaft, a cam shaft arrangement, an ignition device in one or each of the said admission and intermediate admission chambers, apparatus adapted to operate all of the said valve and valve closures and valve controlled channel and passageways when the said piston reciprocates, a method adapted to operatively connect the said piston and shaft and cam shaft arrangement, and instrumentalities for causing the said ignition devices to function.

16. In a device of the kind described the combination of a cylindric inclosure, a primary fluid compression chambers with conjunctive channels and conjoining channel-ways communicating with the said compression chamber and with a source of fluid supply and atmosphere respectively, closures actuated in respective of the said channel and channel-ways and the said compression chamber, a valve actuating mechanism, a piston moving in the said cylindric inclosure, an adjustable member of the said valve actuating mechanism manually controlled to suit different fluid mixtures, a crank shaft connected to the said piston, a cam shaft driven by the said shaft and provided with cams operating the said valve actuating mechanism, a secondary compression chamber provided with a valve controlled channel leading into the said cylindric inclosure, multiplicate way valve controlled passages and passage-ways leading to respective sources of fluid supply and the atmosphere and the cylindric inclosure respectively, the said multiplicate way actuated valve operatively connected to the said valve actuating mechanism, and an ignition apparatus adapted to ignite fluid in the said cylindric inclosure and operatively connected to the said cam shaft.

17. In an engine, in combination, a cylindric inclosure with head closure, a piston closure moving therein, a fluid combustion chamber in the said cylindric inclosure, a valve controlled partition in the said cylindric inclosure, a fluid compression chamber formed between the said partition and piston, an inter-communication controlling valve in the said partition, valve controlled channels leading from respective of the said compression and combustion chambers and connected to different sources of fluid supply, valve controlled exhaust channels each adapted to communicate with respective of the said compression or combustion chambers, valve rods connected to respective of the said valves actuated in the said partition and channels, a cam shaft provided with cams adapted to operate the said valve rods, a crank shaft operated by the said piston and connected to the said cam shaft and driving mechanism, and one end of respective exhaust channels open into the atmosphere.

18. In an engine multiplicate stage per stroke differencing fluid admission before compression and differencing ignition before exhausting apparatus, a cylinder with end closure, a piston closure forming an inclosure provided with an opening leading into the said cylinder, a valve in the said opening, valve controlled admission and exhaust channels opening into respective sources of fluid supply and atmosphere and terminating in respective of the said cylinder and inclosure, certain of the said valves adapted to be independently controlled and four times actuated per revolution at times, a crank shaft and a cam shaft operatively connected to and rotated as the said piston moves, a valve actuating mechanism driven from the said cam shaft and causing all of said valves to function, a manually controlled method and instrumentalities adapted to regulate the quantity of fuel admitted into the said cylinder and inclosure, ignition devices communicating with the said cylinder and inclosures, and an ignition heat producing apparatus actuated in timed relation to the movement of the said cam shaft.

19. In an engine multiplicate stage compression apparatus, a cylinder with head closure, a fluid compression inclosure with channels provided with a distributing valve and leading into the said cylinder, said distributing valve alternately actuated on certain succeeding strokes of the said piston at times, admission valve controlled channels connecting primary and secondary sources of fluid supply and leading into the said cylinder, exhaust valve controlled channels connecting respective passageways leading to the atmosphere, a crank shaft, a cam shaft provided with cams certain of which operate multiplicate peripheric actuating projections and others single acting projections, instrumentalities connecting the said crank and the said cam shaft with the said piston, a valve actuating mechanism operatively connected to the said cam with multiplicate projections and the said distributing valve adapted to compart fluid in the said compression inclosure and the said cylinder, and manually controlled instrumentalities for controlling the volume of and determining the mixture of admitted fluid.

20. In a device of the character described the combination, multiplicate purpose multiplicate stage mixing inclosures independently controlled, multiplicate purpose distributing valves, independently valve controlled channels opening into respective of the said mixing inclosures, certain of the said distributing valves independently actuated and connecting certain of respective of the said inclosures at times, independent valve controlled channels leading from respective of the said mixing chambers, cylinders with head closures, piston closures, a crank shaft arrangement, the said piston and the crank shaft are operatively connected to a cam shaft arrangement provided with cam shaped devices, valve actuating mechanism operated by the said cam shaped devices and controlling the movement of respective of the said valves successively and certain of the cam shaped devices are adapted to and provided for causing certain valves to close communication between respective inclosures or open communication between these inclosures and respective cylinders alternately at times during certain succeeding strokes of the said pistons, and instrumentalities manually controlled for causing respective of the said distributing valves to be moved more or less at times thus determining different fluid mixtures.

21. An engine comprising a cylinder, a cylinder closure, an inclosure adjacent to the said cylinder, a coextending channel-way with a conjunctive passage-way conjointly opening into the said inclosure and the said cylinder, a port opening connecting the said inclosure with the said cylinder, a piston mounted to reciprocate in the said cylinder, a valve in the said port opening, an actuating mechanism operating the said valve, a manually controlled arrangement for adjusting and controlling the action of the said mechanism determining the duration of a period of time that the said valve will remain open and closed relatively to the reciprocations of the said piston, an admission port opening into the said passage-way and connected with a source of fluid supply, a valve in the said admission port opening, an exhaust port in the said passage-way connected to exhaust pipe connections, a valve in the said port, a chamber connected with passage-ways opening into the said cylinder, a valve controlled port opening communicating with the said chamber and with another source of fluid supply, an exhaust port controlled by a valve connected to another exhaust pipe connection, a reciprocating valve actuated to close communication between the said admission port opening and the said exhaust and alternately connected with the said chamber, a valve actuating mechanism operating all of the said valves including the said valve operated by the first said actuating mechanism, an ignition device in the said inclosure, a shaft rotatively connected to the said piston, a cam shaft provided with cams driven by the said shaft and operating the said valve mechanism, and means for causing the said ignition device to ignite fluid.

22. An engine comprising a plurality of cylinders with end closures, a plurality of multiplicate and single stage compression chambers, a plurality of primary admission ports connected to respective sources of fuel supply, a plurality of primary exhaust ports connected to respective passages leading to the atmosphere, a plurality of port openings connecting relative multiplicate and single stage compression chambers, a plurality of conjunctive channels connecting the said admission and exhaust ports and port openings with relative of the said multiplicate and single stage compression chambers, valves actuated in all of the said ports, a plurality of manually controlled instrumentalities for increasing or decreasing the travel of certain ones of the said valves, a plurality of secondary admission ports connected to respective sources of fluid supply, a plurality of secondary exhaust ports leading to the atmosphere, a plurality of chambers and connecting channels opening into the said cylinders and the said secondary admission and exhaust ports, a plurality of valves actuated to open and close respective of all of the said valve and admission ports and the said exhaust and port openings in relative chambers and cylinders, a plurality of cam shafts provided with a plurality of cams, a crank shaft arrangement provided with a plurality of cranks and operatively connected to the said cam shafts and pistons respectively in a determined arrangement, valve actuating mechanism connecting respective cams with respective valves, ignition devices in respective cylinders or chambers, and an ignition system electrically connected to respective ignition devices and operatively connected to or driven by the said cam shaft.

23. An engine comprising a group arrangement of a number of cylinders in which pistons are mounted to reciprocate, multiplicate high and low pressure chambers adapted to contain certain volumes of separately admitted fluid and separately compressed in respective of these chambers communicating with respective of the said cylinders, valve controlled channels communicating with respective sources of fluid supplies and the atmosphere and leading to respective of the said cylinders, valve controlled by-pass channels opening into respective of the said high and low pressure chambers and leading to relative of the said cylinders, distributing valves actuated in the said by-pass channels, a crank shaft provided with crank arrangements and driven by respective of the said pistons, a cam shaft driven by the said crank shaft and provided with cam shaped valve actuating devices, valve actuating mechanism connecting all respective valves and adapted to operate them in timed relation to the movement of respective pistons successively, manually controlled cooperative fluid admission controlling apparatus adapted to vary the quantity of the fluid admitted into the said cylinders, instrumentalities independently determining the movement of the said distributing valves, and an ignition system including ignition devices in respective of the said chambers adapted to ignite fluid successively.

24. In an engine auxiliary multiplicate stage preheating and compression apparatus, a cylinder with head closure, a compression chamber, an auxiliary compression chamber, valve controlled channels connecting respective of the said combustion and auxiliary chambers with respective sources of fluid supply and valve controlled channels connecting them with the atmosphere at times, a piston closure moving in the said cylinder, valve controlled channels connecting the said chambers at times and connecting them with the cylinder at times, and provided with a distributing valve actuated in these channels, a valve mechanism adapted to actuate all of the said valves successively, a cam shaft provided with cams and operatively connected to the said valve mechanism, a crank shaft provided with instrumentalities adapted to rotate the said cam shaft and be rotated by connections operatively connected to the said piston, an igniter in certain of the said chambers, the said distributing valve adapted to be actuated for multiplicate purposes during multiplicate parts of certain strokes of the said piston, and instrumentalities adapted to be driven by the said cam shaft and cause the said ignition devices and valve mechanism to function successively.

25. The combination of multiplicate chambers provided in a cylinder, a cylinder head, multiplicate channels leading into the said chambers and the said cylinder, fluid supply and exhaust channels opening into said cylinder provided with channel-ways leading the said chambers, valve closures provided in all of the said channels and channel-ways, a reciprocating piston closure in the said cylinder adapted to cause the said fluid to enter the said chambers and be mixed and compressed to multiplicate pressures at respective volumes thereof, a valve operating mechanism connected to all of the said valves, a cam shaft and cams operating respective parts of the said valve operating mechanism, a crank shaft connected to the said piston and the said cam shaft, an ignition device in certain of the said chambers, and an ignition associatively connected to the said cam shaft and the said ignition device.

26. In an engine consisting of multiplicate cylinders associatively connected in parallel or divided unitable multiplicate formation, chambers formed in or on the said cylinders and provided with valve controlled intercommunicating channels, piston closures mounted to actuate in the said cylinders and compressing different respective volumes of fluid to comparative high and low pressures in respective of the said chambers opening into the cylinder, valve controlled admission and exhaust channels opening into the said chambers leading into the said cylinders and connected to respective sources of fluid supplies and the atmosphere successively, valve controlled channels connecting respective chambers at times, valve actuating mechanism, a cam shaft provided with cams mounted thereon and operating the said valve actuating mechanism operatively connecting respective of all of the said valves, cranks operatively connected to respective of the said piston closures and operatively connected to a shaft arrangement, ignition devices in certain of respective chambers, an ignition system electrically connected to the said ignition devices, and the cam shaft is connected to a member of the timer-distributor apparatus.

27. An engine comprising multiplicate and single valve controlled channels adapted to communicate with multiplicate sources of fluid supplies and exhaust openings leading to atmosphere respectively and terminating in chambers communicating with a cylinder, a cylinder head attached to the said cylinder and a piston head formed on a piston form an inclosure for certain of the said chambers at times, a two way actuated valve in a by-passage communicating with the said chambers form a larger inclosure at times, the first and the second said inclosures are adapted and provide for multiplicate way fluid admission and succeeding multiplicate way fluid compression in the said cylinder at times, an ignition device in certain of the said inclosures, a crank shaft, a cam shaft, cams driven by the said cam shaft, valve actuating mechanism operatively connecting respective of the said valves with respective of the said cams, the said actuating mechanism adapted to operate all of the said valves successively, a timer-distributor electrically connected to the said ignition device and driven by the said cam shaft, and instrumentalities operatively connecting all of the said cam and crank shafts the piston and the said timer-distributor adapted to move in timed relation to the reciprocations of the said piston.

28. The described engine consisting of multiplicate purpose inter-communicating fluid mixing chambers communicating with the interior of a cylinder provided with stationary and movable closures, multiplicate valve controlled channels communicating with the said cylinder and different sources of fluid supply, multiplicate valve controlled conduits communicating with the said cylinder and containers of a certain fluid, valve controlled channels connecting certain chambers with the said cylinder at times, said mixing chambers adapted to contain fluid subjected to multiplicate differencing compression pressures at times, valve actuating mechanism connected to all respective valves, a cam shaft with cams adapted to actuate the said valve actuating mechanism, a shaft connected to and driven by the said movable closure and driving the said cam shaft, auxiliary associated valve travel regulating mechanism cooperating with the said valve mechanism at all times, and an ignition apparatus provided when needed.

29. In apparatus providing a method for mixing certain fluids in respective chambers and subjected to different pressures in multiplicate stroke per cycle engine devices comprising a cylindric inclosure, chambers supported in juxta-position and provided with valve controlled channels leading into the said cylindric inclosure, said cylindric closure provided with stationary and movable closures, valve controlled channels leading into certain of said chambers and communicating with certain primary sources of fluid supply and the atmosphere respectively, valve controlled channels opening into the said inclosures communicating with certain of the said chambers and leading to certain sources of secondary sources of fluid supply and atmosphere respectively, a shaft operatively connected to the said movable closures, a cam shaft provided with multiplicate valve actuating projections and rotatories connected to the said shaft, valve mechanism including a secondary valve travel adjustment apparatus adapted to actuate all of the said valves and operatively connected to respective of the said projections, and an ignition system to be provided and directly or otherwise caused to function relatively to the reciprocations of the said movable closure.

30. An engine comprising a plurality of inclosures, a plurality of chambers adapted to contain certain fluid mixed and compressed at low pressure and provided with stationary closures, a plurality of chambers adapted to contain certain fluid mixed and compressed at a higher pressure and provided with movable closures, valve controlled channels connecting certain of the said chambers with certain of the inclosures, valve controlled channels connecting certain of the said chambers leading into the said inclosures and connecting with a source of fluid supply and atmosphere respectively, valve controlled channels connecting certain of the said inclosures leading into certain of the said chambers with an auxiliary source of fluid supply and the atmosphere respectively, valve actuating mechanism operatively connected to and actuating all of the said valves successively, a cam shaft arrangement provided with cams certain of which are adapted to actuate respective of certain of the said valves during primary multiplicate-way differencing fluid admission and secondary multiplicate-way fluid compression parts of a cycle and positioning these said valves during multiplicate-way ignition and multiplicate-way exhaustion parts of the said cycle successively, a crank shaft arrangement operatively connected to the said movable closures and the said cam shaft arrangement, ignition devices in certain of the said chambers, and an ignition system provided with timer-distributor and driven from the said cam shaft.

31. An engine comprising an inclosure provided with stationary and movable closures with valve controlled channels opening thereinto and fluid containers formed therein, multiplicate valve controlled channels leading into respective of the said containers and connected to certain sources of fluid supply and atmosphere respectively, valve controlled channels connecting the said containers, a reciprocating distributing valve cooperating with certain of the said movable closures and adapted to determine and distribute respective volumes of fluids admitted and subsequently subjected to certain different compression pressures in certain of the said containers and positioned during subsequent multiplicate-way ignition and ultimately expanded therein and exhausted thereout of the said inclosure successively, a valve actuating mechanism adapted to operate all of the said valves, a crank shaft, a cam shaft provided with cams adapted to actuate the said valve actuating mechanism and operatively connected to the said crank shaft operatively connected to and driven by certain of the said movable closures, manually controlled accessories operatively in control of the movement of the said distributing valve and determining the volume of certain fluid at times, and heat producing devices adapted to cause fluid to be successively ignited.

32. An engine comprising multiplicate cylinders provided with stationary and reciprocating closures forming valve controlled inter-communicating inclosures associatively connected therewith, multiplicate valve controlled channels terminating in multiplicate sources of fluid supplies and the atmosphere respectively and leading into respective of the said inclosures, multiplicate purpose distributing valves provided with mechanically actuated actuating mechanism and manually controlled instrumentalities adapted to be held in certain positions and predetermining variable fluid mixtures entering the said inclosures, valve actuating mechanism adapted to operate all mechanically operated valves, crankshaft combinations and arrangements provided with cranks, cam shaft combinations and arrangements provided with cams, driving mechanism unitedly connecting respective of all group arrangements of the said reciprocating closures with the said crank shaft operating the said cam shaft and operating the said valve mechanism associatively, ignition devices in respective of the said inclosures, and an ignition apparatus adapted to function conjunctively with the said ignition devices and operatively driven from the said cam shaft.

33. In an engine, an inclosed cylinder, a piston closure moving therein, high and low pressure combustion apparatus including a distributing valve and a channel connecting high and low pressures, chambers opening into the said cylinder, the said distributing valve actuated in the said channel to alternately open and close communication between the said high and low pressure chambers at times, multiplicate admission and multiplicate exhaust valves in channels opening into the said cylinder, instrumentalities operatively connected to the said piston and adapted to actuate all of the said valves, and accessories adapted to be manually controlled for determining respective volumes of fluids compressed to comparatively high and low pressures before being ignited and expanded and utilized to promote the conservation of energy produced in the said cylinder.

34. A fluid distributing device comprising a cylinder, a cylinder head closure, a piston closure, multiplicate purpose chambers opening into the said cylinder, channels connecting certain of the said chambers opening into the said cylinder, a distributing valve actuated to allow fluid to pass through the said channels and separating different volumes of different kinds of fluid at variable pressures in the said chambers at times, valves in certain of the said channels leading to certain sources of fluids and the atmosphere respectively, instrumentalities operatively connected to the said piston closure and adapted to operate all of the said valves successively, and instrumentalities manualy controlled at times for adjusting the travel of the said distributing valve relatively to the movement of the said piston closure thus determining the volume of fluids to be compounded in respective of the said chambers and the said cylinder.

35. A compound fluid mixing and distributing device comprising a cylinder, a cylinder head closure, a piston closure forming an inclosure, valve controlled channels connecting various valve controled sources of different kinds of fluid with the said inclosure, valve controlled channels leading from the said inclosure to the atmosphere, a univalve multiplicate way and multiplicate purpose controlled chamber adjoining the said cylinder and adapted to contain fluid successively admitted before compression and mixed before being expanded and exhausted during multiplicate stage cycles and provided with channels opening into the said inclosure and cylinder at times, a manually controlled distributing valve reciprocally actuated and controlling certain of the said channels leading into the said cylinder during succeeding strokes of the said piston at times, a shaft, a cam shaft, instrumentalities operatively connecting the said shafts with each other and with the said piston closure and actuating all of the said valves, actuating mechanism driven by certain of the said shafts and operatively connected to the said piston closure and adapted to operate all of the said valves successively, and ignition apparatus may be provided.

36. In an engine provided with multiplicate stage per stroke combination differencing fluid admission and compression instrumentalities and differencing fluid ignition and exhaustion apparatus, a cylinder with end closure, a chamber with valve controlled channels leading into the said cylinder, an ignition device in the said chamber, a piston closure, a shaft, a cam shaft, admission channels opening into the said cylinder, valves in certain of the said channels connecting sources of fluid supply with the said cylinder and the said valves are independently actuated, the said valve controlling the said channels leading into the said chamber and cylinder respectively is independently actuated and separates respective quantities of fluids in the said cylinder and chamber at times, valve controlled exhaust channels leading into the said cylinder and terminating in the atmosphere and the valve controlling the said channels leading into the said chamber and cylinder which also separates and controls the mixing of ignited fluid with other fluid at times and this said valve functions differently and independently than other of the said valves at times, instrumentalities adapted to reciprocate certain of the said valves during parts of two strokes and position it during two strokes of the said piston closure during succeeding cycles successively, a manually controlled method arrangement of parts for controlling the timed movement of certain of the said valves at times, valve actuating mechanism operatively connected to the said cam shaft and all of the said valves, shaft operating mechanism connecting the said piston closure with the said shaft and cam shaft, an ignition system and actuating devices driven from the said cam shaft, and connections leading to the said ignition device.

37. In an engine multiplicate stage compression apparatus, a cylinder with end closure, a fluid compression inclosure with channels leading into the said cylinder, a piston closure, a distributing valve alternately actuated on parts of certain succeeding compression strokes of the said piston closure at times, admission valve controlled channels connecting respective primary and secondary sources of fluid supply leading into the said cylinder, exhaust valve controlled channels connecting respective passageways leading to the atmosphere and the said cylinder, a crank shaft, a cam shaft, cams on the said cam shaft with respective multiplicate peripherically formed projections and single acting projections, instrumentalities connecting the said crank shaft and the said cam shaft with the said piston closure and included valve actuating mechanism connecting the said cams with the said valves respectively, the said multiplicate projections provided on certain of the said cams and connections leading there from actuate the said distributing valve thus comparting admitted and compressed fluid in the said compression chamber at times, and manually controlled instrumentalities actuated at times to vary the movement of certain of the said valves relatively to the movement of certain of the other valves and thus determining the mixture of the admitted and compressed fluids.

38. In a device of the character described the combination of cylinders, multiplicate purpose multiplicate stage mixing inclosures adapted to contain fluid mixtures composed of different compositions successively compressed to different pressures and evacuated out of respective of the said mixing inclosures and respective of the said cylinders, certain of the said inclosures are connected in series with a respective cylinder at times and disconnected at times successively, multiplicate admission and exhaust valves leading into respective inclosures and cylinders and terminating in respective multiplicate sources of fluid supply and the atmosphere respectively, multiplicate purpose distributing valve controlled channels connecting certain of the said inclosures connected in series with certain of the said cylinders and independently controlled, cylinder head closures, piston closures, a crank shaft arrangement, cam shaft arrangements provided with cam arrangements driven by the said crank shaft, instrumentalities operatively connected to the said piston closure and operating the said crank shaft arrangement and the said cam shaft arrangement including the cams, valve actuating mechanism connecting the said cams with the said valves respectively, certain of the cams provided for actuating mechanism adapted to reciprocate respective of the said distributing valves alternately in channels connecting respective of the said inclosures with channels opening into respective of the said cylinders and connecting these inclosures with each other successively during succeeding strokes of respective of the said piston closures, and manually controlled instrumentalities for causing the said distributing valves to move more or less at times thus determining the volumes of different fluid mixtures.

39. In an engine cooperating auxiliary multiplicate stage multiplicate purpose mixing and preheating fluid compression apparatus associatively attached to a cylinder with head closure, a primary compression chamber, an auxiliary secondary compression chamber, valve controlled channels connecting respective of the first named and the second named of the said chambers with respective sources of fluid supply and other valve controlled channels connecting the said chambers with the atmosphere at times successively, a piston closure, valve controlled by-passages connecting respective of the said chambers leading into respective of the said cylinders at times, a multiplicate purpose multiplicate way actuated distributing valve connecting the said chambers in series at times and disconnecting them at times successively, a crank shaft, a cam shaft provided with valve operating devices, an ignition device in certain of the said chambers, manually controlled mechanism determining the movement of the said distributing valve, instrumentalities adapted to actuate all of the said valves and the said shafts conjunctively and in timed relation to the movement of the said piston, an igniter in certain of the said chambers operatively connected to an ignition system, the said distributing valve adapted to move during parts of certain strokes and reciprocate during other strokes and remain stationary during succeeding and parts of succeeding strokes of the said piston successively, manually controlled accessories adapted to position the said distributing valve to permit a predetermined fluid mixture to enter the said chambers, instrumentalities driven by the said piston closure and operatively connected to the said crank shaft and cam shaft and valve operating devices including the said distributing valve, and an ignition system including a timer-distributor driven in timed relation to the revolutions of the said cam shaft.

40. An engine comprising multiplicate inclosures provided in a cylinder with head closure, multiplicate valve controlled primary and secondary admission channels terminating in multiplicate sources of fluid supply and respective of the said inclosures and multiplicate way valve controlled primary and secondary exhaust channels terminating in the said inclosures and the atmosphere respectively, a by-passage connecting the said inclosures at times controlled by a multiplicate way actuated valve, a piston in the said cylinder forming a closure for certain of the said inclosures at times and certain of the said multiplicate admission and exhaust valve controlled channels at times successively, an ignition device in certain of the said inclosures, a crank shaft, a cam shaft, a manually controlled valve travel adjuster, cams driven by the said cam shaft, valve actuating mechanism operatively connecting respective of the said valves with respective of the said cams and the movement of certain of the said valves and cams is controlled by the position of the said valve travel adjuster, a timer-distributor driven by the said cam shaft, and instrumentalities operatively connecting all of the said cam and crank shafts with the said piston and the said timer-distributor.

41. An engine device comprising a multiplicate way actuated distributing valve controlling a channel connecting intercommunicating inclosures provided in a cylinder with a head closure and a piston closure, the said distributing valve adapted to reciprocate during certain parts of strokes and remain stationary during certain reciprocating strokes of the said piston closure while admitted fluids are being subjected to different pressures and subsequently ignited and ultimately expanded therein and exhausted thereout of the said inclosures and cylinder, manually controlled accessories adapted to be moved into the adjusted position for determining the relative volumes of certain of the said admitted fluids, a crank shaft provided with a crank and connecting rod connection driven by the said piston closure, a cam shaft driven by the said crank shaft and provided with valve actuating cams, multiplicate valve controlled channels opening into and out of respective of the said inclosures and terminating in multiplicate sources of fluid supply and the atmosphere respectively, actuating mechanism operatively connecting respective of the said valves and cams and adapted to operate all of the said valves successively, a heat producing device in certain of the said inclosures operatively controlled by the said cam shaft, and instrumentalities adapted to connect one or more power producing essentials to respective power transmitting engine devices.

42. An engine consisting of a modified arrangement of described essentials associatively connected and comprising cylinders provided with stationary and movable closures, valve controlled intercommunicating inclosures, valve controlled channels terminating in respective of the said inclosures and leading to different sources of fluid supply and the atmosphere respectively, valves in certain of the said channels connecting respective inclosures and respective of the said cylinders at times, the said movable closures and the said valves adapted to function to allow certain volumes of fluids to enter certain of the said channels leading into respective inclosures and cylinders wherein the constituents thereof may be compressed to different pressures in the said respective inclosures and cylinders before being ignited and expanded therein successively, multiplicate shaft combinations and arrangements provided with instrumentalities operatively connected to the said movable closures and respective of the said valves, the said movable closures adapted to be impelled by ignited fluids while expanding thus causing the said shaft and kindred instrumentalities to move conjunctively successively, ignition devices in certain of the said inclosures and fluid ignited therein ignites fluid in a respective inclosure, ignition apparatus operated in timed relation to the movement of respective movable closures and connected to the said ignition devices respectively, and manually controlled instrumentalities and accessories adapted to determine the respective volumes of different fluid mixtures.

43. In an engine multiplicate way manually controlled multiplicate pressure controlled first and second stage compression chambers with valve controlled connecting channel associatively connected to a cylinder with head closure and piston closure, multiplicate admission and multiplicate exhaust channels terminating in the said cylinder and leading to atmosphere respectively, a lever arrangement adapted to be moved to different positions and controlling the movement of fluid through the first said valve controlled connecting channel, the said lever arrangement also adapted to be positioned to determine relative of the pressures in the said first and second stage compression chambers and moved more or less to determine greater or lesser pressures required at times, an ignition device in certain of the said chambers, a crank shaft, a cam shaft provided with cams, valve actuating mechanism connecting respective of the said cams and valves, connecting rod and shaft rotating apparatus connecting the said piston closure with the said crank shaft and cam shaft, and a timer distributor connected to the said ignition device and the said cam shaft respectively.

44. In an engine multiplicate way fluid ignition and exhausting apparatus, cylinders provided with stationary and movable closures, chambers provided with intercommunicating channels terminating in respective of the said cylinders, ignition devices in certain of the said chambers, multiplicate admission and exhaust channels leading into respective of the said cylinders and terminating in multiplicate sources of different kinds of fluid supply and the atmosphere respectively, said ignition devices adapted to primarily ignite fluid in certain respective of the said chambers and this ignited fluid ignites combustible fluid in respective of the other of the said chambers and these ignited fluids are combined and expanded within and exhausted out of respective of the said chambers successively, crank shaft arrangements operatively connected to respective of the said movable closures, cam shaft arrangements provided with actuating cams and driven by the said crank shaft arrangements, valves in control of all of the said channels, a valve actuating mechanism operating all respective cooperating valves with respective of the said cams, manually controlled and mechanically actuated accessories associatively connected and adapted to actuate certain respective of the said valves positioned at certain times and moved at a predetermined time coinciding with the timed primary ignition period at times successively, and a timer-distributor apparatus operatively operated in timed relation to the movement of the said movable closures.

WILLIAM T. SMITH.